United States Patent [19]

Lehnert

[11] Patent Number: 4,580,663

[45] Date of Patent: Apr. 8, 1986

[54] BRAKE JAW BEARING ARRANGEMENT FOR AUTOMOTIVE DISC BRAKES

[75] Inventor: Erhard Lehnert, Dollbergen, Fed. Rep. of Germany

[73] Assignee: WABCO Westinghouse Steuerungstechnik GmbH, Hanover, Fed. Rep. of Germany

[21] Appl. No.: 587,329

[22] Filed: Mar. 7, 1984

[30] Foreign Application Priority Data

Mar. 10, 1983 [DE] Fed. Rep. of Germany ....... 3308499

[51] Int. Cl.[4] ..................... B61H 5/00; F16D 55/224
[52] U.S. Cl. ..................................... 188/59; 188/72.7
[58] Field of Search ................ 188/17, 18 R, 18 A, 188/59, 71.1, 72.6, 72.7, 72.9

[56] References Cited

U.S. PATENT DOCUMENTS

| 2,374,859 | 5/1945 | Gaenssle | 188/59 |
| 3,645,364 | 2/1972 | Otto et al. | 188/59 X |
| 3,986,584 | 10/1976 | Wright et al. | 188/59 X |

FOREIGN PATENT DOCUMENTS

| 2026545 | 12/1971 | Fed. Rep. of Germany | 188/72.6 |
| 1527135 | 10/1978 | United Kingdom . | |

*Primary Examiner*—Bruce H. Stoner, Jr.
*Assistant Examiner*—Richard R. Diefendorf
*Attorney, Agent, or Firm*—J. O. Ray, Jr.

[57] ABSTRACT

The invention relates to a brake jaw arrangement for a disc brake. The brake jaw essentially consists of two brake levers which carry on one end thereof a brake lining holder and on their other end are connected to cooperate with an operating mechanism. The operating mechanism causes the ends of the brake levers equipped with the brake lining holders to be moved toward each other or away from each other.

17 Claims, 3 Drawing Figures

BRAKE JAW BEARING ARRANGEMENT FOR AUTOMOTIVE DISC BRAKES

BACKGROUND OF THE INVENTION

The present invention relates, in general, to a disc-type brake system and, more particularly, the invention is directed to an improved brake jaw bearing arrangement in a disc-type brake brake lever for vehicular and/or industrial-type uses.

Disc brake systems have been known for the last several years. They are in wide use on most of the over-the-road type vehicles, many of the rail vehicles, and in a number of industrial applications. Even so, disc brakes are still a relatively infant technology. Furthermore, in relation to the automotive industry, even if the disc brakes are listed as standard equipment by the manufacturer of the vehicle, it is a technology for which the consumer must pay an added premium; such premium is in the form of a higher base sticker price. Some, but not all, of the major factors associated with the added cost for this improved-type of braking system will be discussed below. One such factor of importance is the care that must be taken to assure, as far as possible, that the bearing arrangement for the disc brake jaw precludes dirt or other extraneous foreign substances from penetrating into the bearings; such bearings reducing the frictional resistance as the brake levers move relative to one another. When, for example, dirt or other extraneous matter does penetrate into the bearing arrangement, excessive wear can and often does occur. This necessitates costly repairs for the vehicle owner, or industrial user, which involves the use of both skilled labor and new parts.

It is of importance not only to the automotive and railroad industry, but to the consuming public as well, to achieve a design for a bearing arrangement for both brake levers of a disc brake arrangement that is as free of wear as possible or practical within reasonable price constraints. Because of this importance, consideration has been given to providing a disc-type brake system having a bearing arrangement incorporated therein which utilizes an increased number of seals. The additional seals provided would be a number which, in the manufacturer's opinion, would be sufficient to prevent the undesirable penetration of extraneous substances into the bearings. The additional seals, however, require an additional expenditure by the disc brake manufacturer, which the consumer must ultimately absorb. Therefore, the added cost must be balanced against the longer life expectancy for the component parts and the resulting lower maintenance costs. There would still remain, however, even with this added precaution and lower cost, a certain degree of uncertainty that such increased number of seals would continue to be operative over an extended period of operation of the braking system when installed on a vehicle or industrial application.

An additional disadvantage of the prior art type brake jaw bearing arrangements for the brake levers of vehicular-type disc brakes that is recognized in the industry is the significant number of component parts required. One very obvious disadvantage to having a larger number of components is the fact that they will wear out; and as wear occurs, the efficiency of the system may be impaired until finally they will have to be replaced at a significant cost, in many cases to the vehicular owner or industrial user of the system. What has not been obvious heretofore is a disc brake system having fewer components.

Another obvious disadvantage is the added skilled labor and material costs incurred by the vehicle manufacturer or industrial user of a disc brake system for the purchase and assembling of these extra parts.

In addition, and possibly even the single biggest disadvantage in prior art disc brakes having a large number of parts, is the maintenance of the system. This may be a particular problem in the automotive area unless the mechanic entrusted with the repair and/or maintenance of one of the most critical parts of a vehicle is skillful and, even more importantly, is concerned about the quality of his or her workmanship.

Prior art brake jaw bearing arrangements for the brake levers on disc-type brake systems have yet another extremely serious drawback, which contributes to the considerable amount of wear to the component parts. This drawback is the number of parts which must move relative to each other. Obviously, relative movement between such parts adds to the wear and tear of the component parts, and the wear and tear adds to the maintenance costs that must be absorbed by the owner of the vehicle or machinery having such disc brakes.

As with the obvious problem with the seals discussed above, even though it is well known in the industry that parts which move relative to one another cause wear, the solution to reducing the number of such parts has not been heretofore obvious.

One other disadvantage with prior art disc brakes is the care which must be taken to ensure surface contact of the entire pad with the disc brake member, such as a rotor, or the like.

Many of the above disadvantages relate primarily to automotive disc brakes, while others are found primarily when disc brakes are used in the railroad industry or industrial application. However, because of their improved performance, they are being used on a wider scale. This is particularly true in the rapid transit area of the railroad industry. See, for example, British Pat. No. 1,527,135 incorporated herein by reference. Also, of interest is U.S. Pat. No. 3,986,584 also incorporated herein by reference.

Therefore, notwithstanding all of the above enumerated disadvantages to prior art disc brakes, it is recognized that they have made a substantial impact on vehicle safety and comfort, therefore disc brakes are of extreme importance in vehicle use.

SUMMARY OF THE INVENTION

The invention taught in this specification provides an improved brake jaw bearing arrangement, having a minimum number of component parts, for the brake levers of a disc-type brake system useful in automotive, railroad, and industrial applications. The brake jaw bearing arrangement, according to the invention, comprises a first brake lever and a second brake lever, which are positioned to rotate in a bearing assembly. Both of the brake levers are equipped with at least one holder for a disc-type brake lining pad on one end thereof. The ends of the brake levers, equipped with the brake lining holders, include a clamp means for holding the disc-type brake pad. An operating mechanism is also provided, which is connected to cooperate with both brake levers in a manner that will cause the ends of the brake levers which carry the disc brake pads to move toward and away from each other during application and release of the brakes, respectively. The bearing device of the invention for the brake levers comprises a bearing pin and a bearing to receive the bearing pin. The bearing pin is torsionally-connected to the brake lever.

OBJECTS OF THE INVENTION

It is, therefore, one of the primary objects of the invention to provide an improved brake jaw bearing arrangement designed for the brake levers on a disc-type brake system that achieves reduced wear of the bearing assemblies.

Another object of the invention is to provide an improved brake jaw bearing arrangement design for the brake levers on disc-type brakes that requires a minimum number of seals to protect the bearings against contamination by extraneous foreign substances.

Still another object of the invention is to provide an improved brake jaw bearing arrangement for the brake levers on disc-type brakes which uses a minimal number of parts with the resultant advantage of lower cost and, of even more importance, fewer parts to wear out.

Yet another object of the invention is to provide an improved bearing arrangement for the brake levers of disc-type brakes which is less costly to manufacture.

A further object of the invention is to provide an improved brake jaw bearing arrangement for the brake levers on automotive-type disc brakes which requires less skill on the part of the mechanic for repair due to the simplicity of design.

A still further object of the invention is to provide an improved brake jaw bearing arrangement for the brake levers of disc-type brakes which allows the bearing pin to be torsionally-connected to the brakes.

Yet still another object of the invention is to provide an improved brake jaw bearing arrangement for the brake levers of disc-type brakes, which have a minimum number of parts which move relative to one another to thereby reduce wear on individual component parts.

Yet still another object of the invention is to provide an improved brake jaw bearing arrangement for the brake levers of disc-type brakes that allows the bearing pin to be constructed in a single piece.

An additional object of the invention is to provide an improved brake jaw bearing arrangement for the brake levers of disc-type brakes, which allows not only the bearing pin to be constructed in one piece, but also allows one of the brake levers and the bearing pin to be a single piece.

From the above, and from the more detailed description which follows, when taken in conjunction with the attached drawings, these and various other objects and advantages of the invention will become more apparent to those persons skilled in the art of disc-type brakes.

BRIEF DESCRIPTION OF THE EMBODIMENTS OF THE INVENTION

Figure 1:
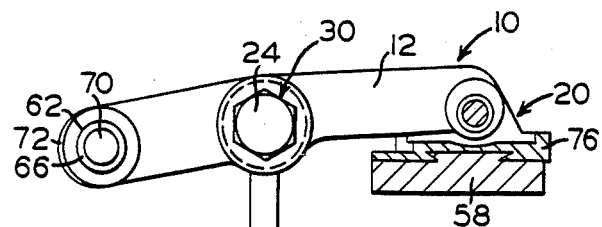
FIG. 1 is a plan view of the brake levers of a brake jaw assembly.

When referring to the drawings, like numerals will be used throughout the several views to designate identical parts that have been shown in the various Figures.

Although the invention will be described as it relates to a vehicle application, such as automotive or railway cars, it is not to be thus limited thereby. The invention will also have utility in application to brake systems for slowing and/or stopping industrial machinery as well. Such application of the principles of this invention to industrial uses will become obvious to those persons skilled in the art.

Figure 2:
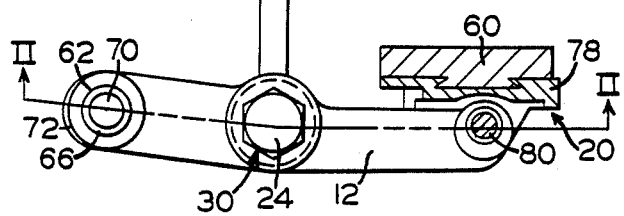
FIG. 2 is a view, partially in cross-section, of a brake lever of a brake jaw assembly taken along lines II—II of FIG. 1 which shows one form of the invention.

Now, refer to FIGS. 1 and 2 of the drawings, which is a representation of a brake lever and a brake jaw of a vehicular-type disc brake assembly, generally designated 10. The brake lever and brake jaw assembly 10, according to the presently contemplated preferred embodiment of the invention, comprises an upper brake lever arm 12 and a lower brake lever arm 14. The upper brake lever arm 12 includes, intermediate the ends thereof, a threaded aperture 16 therethrough. The purpose of the threaded aperture 16 will be explained hereinafter. The lower brake lever arm 14 also includes, intermediate the ends thereof, an aperture 18. The aperture 18, according to this embodiment of the invention, is unthreaded. The upper brake lever arm 12 and the lower brake lever arm 14, along with the other components, for connections, etc. form a set, generally designated 20. One set of components 20 is positioned on each side of a brake crossbar member 22 to form a complete disc brake jaw assembly 10.

A one-piece bearing pin, generally designated 30, is also provided, and serves two functions of primary importance. First, the bearing pin 30 serves as an axle, around which the upper brake lever arm 12 and the lower brake lever arm 14 are pivotally-connected. Secondly, it functions, in cooperation with other components, to be explained hereinafter, as one of the components that holds the upper brake lever arm 12 and the lower brake lever arm 14 in a more or less substantially parallel-spaced relationship in the final assembly, generally designated 10. As illustrated, the bearing pin, generally designated 30, includes a head 24 and a first threaded portion 26 adjacent the head 24. The head 24 is adapted for holding or turning with conventional wrenches. The first threaded portion 26 is integrally-connected to a second unthreaded portion 28, which serves as the main body of the bearing pin, generally designated 30. The first threaded portion 26 has a larger diameter than the second unthreaded portion 28 of the main body. A third end portion 32, having threads thereon, is formed integral with the second unthreaded portion 28 and has the smallest diameter of the one-piece bearing pin, generally designated 30.

Although it is not presently contemplated as a preferred embodiment, it should now be obvious to a person skilled in the art for the above teaching, that the unthreaded portion 28 and the threaded portion 32 of pin 30 could be formed as a single piece with the upper brake lever arm 12. This would not adversely affect the function or operability of the brake jaw assembly 10.

As further illustrated in FIGS. 1 and 2, a first portion of the second unthreaded portion 28 of the main body, which is adjacent the first threaded portion 26, is arranged in such a manner that it is rotatable in a body member 34 after the first threaded portion 26 has been threaded into aperture 16 of the upper brake lever arm 12. Although it is presently preferred that body member 34 be cylindrical, other shapes can be used without departing from the spirit of the invention. A cylindrical body member 34 is secured to each end of the brake crossbar member 22. In the final assembled relationship, the cylindrical body member 34 is centrally-located between, and in abutting relationship with, an inside surface of the upper brake lever arm 12 and lower brake lever arm 14. Disposed within an annular space formed between the inner surface of cylindrical body member 34 and the outer surface of the first portion of the second unthreaded portion 28 of the main body of the bearing pin 30, adjacent the first threaded portion 26, is a bearing 36. The cylindrical body member 34 and the bearing 36 are two of the components mentioned above, which cooperate with the bearing pin, generally designated 30, in maintaining the upper brake lever arm 12 and the lower brake lever arm 14 in the more or less substantially parallel-spaced relationship of the final assembly of each set 20 of the disc brake jaw assembly, generally designated 10.

A second bearing 38 is placed over a second portion of the second unthreaded portion 28 of the main body of the bearing pin, generally designated 30, into abutting relationship with the bearing 36. The unthreaded aperture in the lower brake lever arm 14 is then placed over the bearing 38.

The bearing 38 fills an annular space formed between the unthreaded aperture 18 of the lower brake lever arm 14 and the second portion of the second unthreaded portion 28 of the main body of the bearing pin, generally designated 30. The bearing 38 thereby provides support for the lower brake lever arm 14. A ring-shaped spring element 40 is placed over the bearing pin, generally designated 30, into mating engagement with the outer surface of the lower brake lever arm 14. A shoulder 42, formed around a spacer element 44, is placed into mating engagement with the ring-shaped spring element 40. A crown nut 46 is then positioned over the smaller end portion 32 of the bearing pin 30 and is held in place by a cotter pin 48. In this manner, the lower brake lever arm 14 is secured against axial movement and the cotter pin 48 prevents accidental loosening of the crown nut 46. However, also in this arrangement, in contrast to the upper brake lever arm 12, the lower brake lever arm 14 is free to rotate about the bearing pin 30 if necessary for alignment purposes.

As can be seen in normal rotation of the upper brake lever arm 12 and the lower brake lever arm 14, the only surfaces moving relative to one another are the outer surface of bearing 36 and the inner surface of cylindrical body member 34.

The cylindrical body member 34, formed as part of the crossbar member 22, has a pair of annular recesses 50 and 52 formed on the outer surface thereof, one on each end; and a pair of resilient seal members 54 and 56 are placed in engagement with these annular recesses 50 and 52 and the inner surface of the upper brake lever arm 12 and the lower brake lever arm 14. The sealing gaskets 54 and 56 shown are O-rings which create a seal at the juncture where the surface of the upper brake lever arm 12 and the lower brake lever arm 14 are engaged by the cylindrical body member 34 to prevent the undesired penetration of dirt or other extraneous foreign matter.

Figure 3:
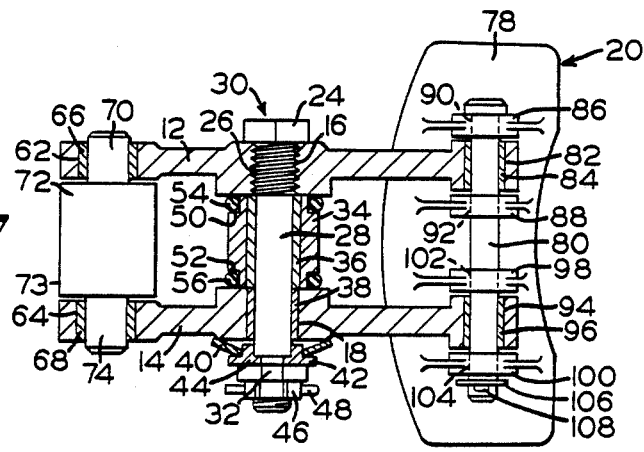
FIG. 3 is a side elevation view, partially in cross-section, which shows an alternative embodiment of the invention.

As is shown on the left-hand side of FIGS. 1, 2 and 3, the disc brake assembly 10 is equipped for cooperation with an operating mechanism (not shown) for moving a pair of disc brake pads 58 and 60 into and out of engagement with a brake pressure pad, such as a rotor, or the like, (not shown) upon application and release of the brakes, respectively, by the operator of the vehicle. Other than as they apply toward the combination of the invention as a whole to make a complete operating unit, the operating mechanism and the brake pressure pad are not new. To provide for this cooperation with the operating mechanism, the upper brake lever arm 12 (FIGS. 1 and 2) is provided with an aperture 62 and the lower brake lever arm 14 (FIGS. 1 and 2) is provided with an aperture 64. Fitted within the aperture 62 is a bearing 66 and within the aperture 64 is another bearing 68. The journal pin 70 of a roll 72 is placed for rotation in bearing 66 and the journal pin 74 of the roll 72 is placed for rotation in bearing 68. The face of the roll 72 now serves as an abutment surface 73 for the operating mechanism (not shown). Also, the roll 72 provides another function in the final assembly of the brake jaw arrangement in maintaining the upper brake lever arm 12 and the lower brake lever arm 14 in a more or less substantially parallel-spaced relationship.

As shown on the right-hand side of FIGS. 1, 2 and 3, the disc brake assembly 10 is equipped with a disc brake pad 58, secured to a brake pad holder 76, and disc brake pad 60 is secured to a brake pad holder 78. The brake pad holders 76 and 78 are secured for limited rotational movement to the upper brake lever arm 12 (FIGS. 1 and 2) and the lower brake lever arm 14 (FIGS. 1 and 2) by a pin 80 in the manner to be described. The upper brake lever arm 12 (FIGS. 1 and 2) has an aperture 82 at the end thereto which has a bearing 84 disposed therein. The aperture 82 of the upper brake lever arm 12 and the bearing 84 are positioned between a pair of upstanding legs 86 and 88 secured to the back of the holder 78. Upstanding leg 86 has an aperture 90 and upstanding leg 88 includes an aperture 92. The lower brake lever arm 14 (FIGS. 1 and 2) is similarly equipped with an aperture 94 at the end thereof and includes a bearing 96 disposed therein. The aperture 94 of the lower brake lever arm 14 and the bearing 96 are positioned between a pair of upstanding legs 98 and 100 also secured to the back of holder 78. Upstanding leg 98 has an aperture 102 and upstanding leg 100 includes an aperture 104. After pin 80 is inserted through the apertures 90, 92, 102 and 104 of the upstanding legs 86, 88, 98 and 100 in addition to bearings 84 and 96, a washer 106 is placed over an end of pin 80 adjacent the outer surface of the upstanding leg 100. The washer 106 is held in place by a suitable means such as a cotter pin 108.

The upstanding legs 88 and 98 combine with the roll 72 and the cylindrical body member 34 in maintaining the upper brake lever arm 12 and the lower brake lever arm 14 in a more or less substantially parallel-spaced relationship.

Now refer to FIG. 3 for a showing of one side of a brake jaw assembly according to an alternate arrangement for connecting a set of brake levers, generally designated 110, to the brake crossbar member (not shown). It being understood that it requires two sets of brake lever assemblies 110 to form the brake jaw assembly. A set of brake levers 110 includes an upper brake lever arm 112 and a lower brake lever arm 114. Connected to the inside surface of the upper brake lever arm 112 intermediate the ends thereof is a neck portion 116. Neck portion 116 extends downwardly from the inside surface of the upper brake lever arm 112 for a predetermined distance. An aperture 118 is provided through the upper brake lever arm 112 and the neck portion 116. Similarly, there is connected to the inside surface of the brake lever arm 114, a neck portion 120 intermediate the ends thereof. The neck portion 120 extends upwardly from the inside surface of the lower brake lever arm 114 for a predetermined distance. It is presently contemplated, and in the specific embodiment shown, that the length of the neck portion 116 is substantially equal to the length of the neck portion 120. An aperture 122 is provided through the lower brake lever arm 114 and the neck portion 120. Positioned on the outer surface of neck portion 116 is a bearing 124 and on the outer surface of the neck portion 120 is a bearing 126. The upper brake lever arm 112, neck portion 116, and the bearing 124 are then placed into the top of a cylindrical body member 128 which is connected to one end of a brake crossbar member (not shown in FIG. 3). The lower brake lever arm 114, neck portion 120, and bearing 126 are then placed into the bottom of the cylindrical body member 128. A pin 130 is then placed through the aperture 118 of the upper brake lever arm 112 and the neck portion 116, and also through the aperture 122 of the lower brake lever arm 114 and the neck portion 120. A crown nut 132 is then threaded onto one end of pin 130 against a washer 134 and held in place by a cotter pin 136. In this arrangement, both the upper brake lever arm 112 and the lower brake lever arm 114 are free to rotate within the bearings 124 and 126 while the pin 130 is restrained against relative movement therebetween. Also, the neck portions 116 and 120 serve the function of acting as bearing pins for the brake lever arms 112 and 114.

It is also possible, although not preferred, to use an external clamp means to hold the upper brake lever arm 112 and the lower brake lever arm 114 in position on the cylindrical body member 128. In this case, pin 130 and apertures 118 and 122 are not required.

As described previously, the left-hand side of the brake assembly 110 is equipped for cooperation with an operating mechanism (not shown) for moving a pair of disc brake pads into and out of engagement with a brake pressure pad, such as a rotor, or the like (not shown) upon application and release of the brakes, respectively, by the operator of the vehicle. Also, as shown, on the right-hand side, the disc brake assembly 110 is equipped with a brake pad holder 78.

While both a presently contemplated preferred embodiment and an alternative embodiment have been shown, it should be obvious to those persons skilled in the art of disc brakes that other adaptations and modifications can be made without departing from the spirit and scope of the attached claims.

I claim:

1. An apparatus to frictionally-engage a brake pad carried by a brake pad holder with a brake disc member upon actuation of an operating mechanism, said apparatus comprising:
   (a) a first brake lever arm connectable at one end thereof to such brake pad holder and having a portion at an opposite end thereof equipped to provide an abutment surface with such operating mechanism;
   (b) a second brake lever arm spaced from said first brake lever arm and connectable at one end thereof to such brake pad holder and having a portion at an opposite end thereof equipped to provide an abutment surface with such operating mechanism;
   (c) at least one of said first and said second brake lever arms having an aperture therethrough intermediate said ends thereof;
   (d) a pivotal member secured in a nonrotatable manner to at least one of said first and said second brake lever arms intermediate said ends thereof;
   (e) a bearing means contacting at least a portion of an outer surface of said pivotal member for reducing rotational friction;
   (f) a brake crossbar member having secured thereto on at least one end thereof a first means for receiving therein said bearing means and at least a portion of said pivotal member said brake crossbar member having means at the other end thereof for connecting to means for carrying another brake pad; and
   (g) a second means for maintaining said first and said second brake lever arms adjacent opposed ends of said first means, at least a portion of said second means being disposed through said aperture in said at least one of said first and said second brake lever arms, whereby each of said first and said second brake lever arms are independently pivotable.

2. An apparatus, according to claim 1, wherein said first means comprises a cylindrical body member.

3. An apparatus, according to claim 2, wherein said apparatus further comprises a means for sealing a juncture between said first brake lever arm and an adjacent end of said cylindrical body member and a juncture between said second brake lever arm and an adjacent opposed end of said cylindrical body member.

4. An apparatus, according to claim 3, wherein said sealing means comprises:
   (a) an annular groove at each of said opposed ends of said cylindrical body member on an outer surface thereof; and
   (b) a resilient sealing member disposed in said grooves for sealing said junctures.

5. An apparatus, according to claim 1, wherein each of said first and said second brake lever arms has an aperture therethrough intermediate said ends thereof.

6. An apparatus, according to claim 5, wherein one of said apertures intermediate said ends of said first and said second brake lever arms is at least partially threaded.

7. An apparatus, according to claim 6, wherein said pivotal member is a pin having a first threaded portion for engaging said at least partially-threaded aperture in one of said first and said second brake lever arms.

8. An apparatus, according to claim 7, wherein said second means comprises:
   (a) an unthreaded portion having one end thereof formed integral with said first threaded portion of said pin positioned through an unthreaded aperture in one of said first and said second brake lever arms intermediate said ends thereof;
   (b) a second threaded portion formed integral with and adjacent to an opposite end of said unthreaded portion formed integral with said pin;
   (c) a bearing disposed between said unthreaded portion of said pin and said unthreaded aperture in said one of said first and said second brake lever arms; and
   (d) a nut disposed on said second threaded portion of said pin.

9. An apparatus, according to claim 8, wherein said second means further comprises:

(a) a spring element disposed adjacent an outer surface of said one of said first and said second brake lever arms having said unthreaded aperture;

(b) a spacer element disposed between and in contact with said spring element and said nut on said threaded portion of said pin; and (c) a means for preventing rotation of said nut disposed in contact with said nut.

10. A brake jaw assembly to frictionally-engage a brake pad carried by a brake pad holder with a brake disc member upon actuation of an operating mechanism, said brake jaw assembly comprising:

(a) two brake lever assemblies, each brake lever assembly having a pair of brake lever arms connectable at one end thereof to a brake pad holder and each of said pair of brake lever arms connectable at an opposite end thereof to a roll to provide an abutment surface with such operating mechanism;

(b) at least one of said pair of brake lever arms on each of said two brake lever assemblies having an aperture therethrough intermediate each end thereof;

(c) a pivotal member secured in a nonrotatable manner to at least one of said pair of brake lever arms in each of said two brake lever assemblies intermediate each end of said at least one of said pair of brake lever arms;

(d) a bearing means contacting at least a portion of an outer surface of said pivotal member in each of said two brake lever assemblies;

(e) a brake crossbar member having secured thereto on each end thereof a cylindrical body portion respectively receiving therein said bearing means and at least a portion of said pivotal member; and (f) a means for maintaining each respective pair of brake lever arms in abutting relationship with opposed ends of a respective cylindrical body portion, at least a portion of said means being disposed through said aperture in a respective said at least one of said brake lever arms on each side of said two brake lever assemblies, whereby each of said respective brake lever arms is independently pivotable in each of said two brake lever assemblies.

11. An apparatus, according to claim 10, wherein each of said pair of brake lever arms on each of said two brake lever assemblies has an aperture therethrough intermediate each end thereof.

12. An apparatus, according to claim 11, wherein one of said apertures in each of said pair of brake lever arms of said two brake lever assemblies is at least partially threaded.

13. An apparatus, according to claim 12, wherein said pivotal member secured in said nonrotatable manner to said at least one of said pair of brake lever arms in each of said two brake lever assemblies is a pin having a threaded portion for engaging said one of said at least partially threaded apertures in each of said pair of brake lever arms in each of said two brake lever assemblies.

14. An apparatus to frictionally-engage a brake pad carried by a brake pad holder with a brake disc member upon actuation of an operating mechanism, said apparatus comprising:

(a) a first brake lever arm connectable at one end thereof to such brake pad holder and having a portion at an opposite end thereof equipped to provide an abutment surface with such operating mechanism;

(b) a second brake lever arm spaced from said first brake lever arm and connectable at one end thereof to such brake pad holder and having a portion at an opposite end thereof equipped to provide an abutment surface with such operating mechanism;

(c) a pair of pivotal members, one of said pair of pivotal members being secured in a nonrotatable manner to an inner surface of said first and brake lever arm intermediate each end thereof, and a second of said pair of pivotal members being secured in a nonrotatable manner to an inner surface of said second brake lever arm intermediate each end thereof;

(d) a bearing means contacting an outer surface of each of said pair of pivotal members for reducing rotational friction;

(e) a brake crossbar member having secured thereto on at least one end thereof a first means for receiving therein said bearing means and said pair of pivotal members respectively on each of said first and said second brake lever arms said brake crossbar member having means at the other end thereof for connecting to means for carrying another brake pad; and (f) a second means for maintaining said first and said second brake lever arms adjacent opposed sides of said first means in a manner such that said first and said second brake lever arms are independently pivotable.

15. An apparatus, according to claim 14, wherein said pair of pivotal members secured to each of said first and said second brake lever arms, respectively, are integrally-formed as a portion of said brake lever arms.

16. An apparatus, according to claim 15, wherein each of said first and said second brake lever arms and corresponding pivotal members have an aperture therethrough and said second means is a pin disposed through said apertures.

17. An apparatus, according to claim 16, wherein said opposite end of said first and said second brake lever arms are connected to a roll which provides said abutment surface with such operating mechanism.

* * * * *